(12) United States Patent
Day

(10) Patent No.: US 7,302,270 B1
(45) Date of Patent: Nov. 27, 2007

(54) TIME INTERVAL PROCESSING AND ANNOTATION IN PRESENCE SYSTEMS

(75) Inventor: Mark Stuart Day, Milton, MA (US)

(73) Assignee: Cisco Technology, Inc., San Jose, MA (US)

( * ) Notice: Subject to any disclaimer, the term of this patent is extended or adjusted under 35 U.S.C. 154(b) by 156 days.

(21) Appl. No.: 10/909,946

(22) Filed: Aug. 2, 2004

(51) Int. Cl.
*H04Q 7/20* (2006.01)

(52) U.S. Cl. .............. 455/456.1; 455/412.1; 455/412.2; 455/404.2; 455/432.3; 455/466; 455/456.2; 455/456.3; 455/456.5; 455/456.6; 709/206; 709/220; 709/224

(58) Field of Classification Search .......... 455/412.1, 455/412.2, 404.2, 456.1–457, 466; 709/206, 709/220, 224
See application file for complete search history.

(56) References Cited

U.S. PATENT DOCUMENTS

| | | | |
|---|---|---|---|
| 6,697,840 B1 * | 2/2004 | Godefroid et al. .......... 709/205 |
| 6,757,722 B2 * | 6/2004 | Lonnfors et al. ........... 709/220 |
| 6,944,443 B2 * | 9/2005 | Bates et al. .............. 455/414.2 |
| 6,973,299 B2 * | 12/2005 | Apfel ...................... 455/412.2 |
| 6,985,742 B1 * | 1/2006 | Giniger et al. ........... 455/456.1 |
| 2002/0035605 A1 * | 3/2002 | McDowell et al. ......... 709/206 |
| 2002/0042266 A1 * | 4/2002 | Heyward et al. ........... 455/414 |
| 2002/0184089 A1 * | 12/2002 | Tsou et al. .................... 705/14 |
| 2003/0217142 A1 * | 11/2003 | Bobde et al. ............... 709/224 |

* cited by examiner

*Primary Examiner*—Steve M. D'Agosto
(74) *Attorney, Agent, or Firm*—Chapin IP Law, LLC; Barry W. Chapin, Esq.

(57) ABSTRACT

A method, apparatus and computer program product for performing time interval processing and annotation in presence systems includes obtaining presence information attributes relating to a presentity. The presence information for the presentity is modified with presence information attributes to provide annotated presence information for the presentity. The annotated presence information is then forwarded to at least one subscriber.

21 Claims, 3 Drawing Sheets

TIME INTERVAL PROCESSING AND ANNOTATION IN PRESENCE SYSTEMS

BACKGROUND

Presence information comprises a dynamic profile of an entity (typically referred to as a "presentity", "publisher" or "provider"), which is visible to others (sometime referred to as "subscribers"). This dynamic profile can be used for multiple purposes, such as to control a presentity's communication, to share relevant information with subscribers, and to control network-based services. In addition, applications and services (e.g., advertising, weather service) can also publish or use presence information.

Presence information makes communication more effective and appropriate, allowing a subscriber to see whether the other party (presentity) is available and what is the most suitable way to contact that person (e.g., place a call or send a message). Not only can individuals publish their presence information, but also companies and applications can use presence information for advertising and as an information channel. Presence is also a powerful tool that enables users to personalize how they appear in other devices through the presence-enhanced devices such as a mobile phone book. Services such as online games and instant messaging make use of presence information.

Presence information can be used in many ways. Individuals can publish their presence information and check the presence information of others. In essence, presence does two things, it makes one person's presence information available to others and it makes the presence information of others available to the one person. Because presence enables rich forms of expression, including images and text, it can be used to control personal appearance to those who are interested in the user. Presence enables users to control their communication more effectively, indicating when, how, and to whom users are available. Communication also can be stimulated with presence. This provides for appropriate communication for both the initiating and receiving party, whether the communication is voice calls, messaging, voicemail, etc. Presence information can be used for context sharing. The sharing of presence information gives people the possibility of indicating their status, and can identify anything from location, moods, and emotions, to context and preferred means of communication, or an alternative contact. Presence information can be anything that is relevant for subscribers to know and what the publisher is willing to share. The presence publisher can be any object, including a person, a parcel package being delivered, a vending machine out of stock, or a computer related system or device. Presence systems work reasonably well when dealing with people in the same time zone. They also work adequately when dealing with people located in known, different time zones. Conventional presence systems are described in Request For Comments (RFC)-2778, the disclosure of which is hereby incorporated by reference.

SUMMARY

Certain conventional systems publish a status such as "available". However, such a status may not be indicative of further information the presentity would like to make available. Some conventional presence systems include further information relating to time such as publishing either a time zone tag or the person's local time as conventional presence information, however due in part to varying work schedules maintained by different people, this time zone tag or person's local time is insufficient to provide the information relating to the individual's person availability on a given date at a given time. As an example, a scenario may exist wherein a presentity publishes only an "available" or "busy" indicator. A subscriber subscribes to the presentity's presence information but because the presentity is a globetrotting executive, the subscriber has no idea what time zone the presentity is in on any given day.

Other conventional systems utilize a calendaring protocol that deals with time zone issues by forcing a canonicalization of schedules to Greenwich Mean Time (GMT). Canonicalization is acceptable in certain situations where it is desirable to ascertain overlap of available or unavailable times for the presentity. However, such an approach is not useful for other situations such as the one described above, since it is desirable to provide a cultural connotation of a local time as opposed to an absolute value of time in a single universal time system.

Another conventional system utilizes a Presence Information Data Format (PIDF) to define a basic format for representing presence information for a presentity. The PIDF format defines a textual note, an indication of availability and a Universal Resource Identifier (URI) for communication. PIDF is useful to convey additional information about a user. PIDF includes several elements. One such element is an activities element, which describes what the presentity is currently doing. This can be helpful to a subscriber in determining how appropriate a communication attempt is and which means of communications is most likely to succeed and not annoy the presentity.

PIDF also includes a class element. The class element describes the class of the tuple. Multiple tuples can have the same class name within a presence document. The presentity can use this information to group similar tuples or to convey information that the presence agent can use for filtering.

Another element is the contact type element. The contact type element describes the type of the tuple. A tuple can represent a communication facility ("device"), a face-to-face communication tuple ("in-person"), a set of devices offering a common service ("service"), or a whole presentity ("presentity").

PIDF further includes an idle element which records the absolute time and date the communication device was last used. This provides an indication as to how likely a user is to answer when contacting that device. A device that has not been used in a while may still be available, but a subscriber may choose to first contact a device that is both available and has been used more recently. The idle time refers to the whole device, not just the particular service. For example, a tuple describing an instant messaging device expresses the last time that the Personal Computer (PC) or Personal Digital Assistant (PDA) was used, not the last time an instant message was sent.

Another element is known as a place type element. The place type element describes the type of place the presentity is currently located. This offers the subscriber an indication what kind of communication is likely to be appropriate.

Another PIDF element is the privacy element. The privacy element indicates whether third parties may be able to hear or view parts of the communication. Another element of the PIDF is the relationship element. The relationship element designates the type of relationship an alternate contact has with the presentity. This element is provided only if the tuple refers to somebody other than the presentity.

The PIDF may further include a sphere element. The sphere element designates the current state and role that the presentity plays. For example, it might describe whether the presentity is in a work mode or at home or participating in activities related to some other organization such as a church.

PIDF may also include location information within a presence document. This status element of PIDF can be extended with a complex element called 'geopriv'. There are two major subelements that are encapsulated within geopriv: one for location information, and one for usage rules. By composing these two subelements under 'geopriv', the usage rules are clearly and explicitly associated with the location information.

Each geopriv element contains one 'location-info' element. A location-info element includes or more chunks of location information. The Geography Markup Language (GML) is commonly used for modeling all manner of geographic object types, topologies, metadata, coordinate reference systems and units of measurement. The simplest package for GML supporting location information is the 'feature.xsd' schema. Various format descriptions (including latitude/longitude based location information) are supported by the feature.xsd schema. Complex features (such as modeling topologies and polygons, directions and vectors, temporal indications of the time for which a particular location is valid for a target) are also available in GML, but require importing additional schemas.

Geopriv also includes a 'usage-rules' element. There are three attributes in the usage rules element: one attribute that limits retransmission, one attribute that limits retention, and one attribute that contains a reference to external rule sets.

The attribute that limits retransmission is the 'retransmission-allowed' attribute. When the value of this attribute is 'no', the recipient of this location object is not permitted to share the enclosed location information, or the object as a whole, with other parties. When the value of this element is 'yes', distributing this location information is permitted.

The attribute that limits retention is the 'retention-expires' attribute. This attribute specifies an absolute date at which time the recipient is no longer permitted to possess the location information and its encapsulating location object—both may be retained only up until the time specified by this field.

The attribute that contains a reference to an external rule set is the 'rules-reference': This attribute contains a URI that indicates where a full reference of policies related to this object can be found.

Conventional mechanisms such as those explained above suffer from a variety of deficiencies. One such deficiency is that in conventional presence systems it is a challenge attempting to deal with people whose time zone is either unknown or otherwise unpredictable. Even if the remote person's presence is correctly advertised, it is easy to misjudge whether that person is starting their workday, ending their workday, or working away in the middle of the night, which in turn can affect both what's sensible to say to them and what is reasonable to ask the person to do.

Embodiments of the invention significantly overcome such deficiencies and provide mechanisms and techniques that provide time interval processing and annotation in presence systems.

In a particular embodiment of a system for performing time interval processing and annotation, a presence service is in communication with the presentity and with at least one subscriber. The presence server includes presence information for the presentity. The presentity provides presence information attributes to the presence server. The presence server applies a rule using the presence information and the presence information attributes from the presentity to produce annotated presence information for the presentity. The annotated presence information is then provided to subscribers subscribing to the presentity's presence information. In particular, a subscriber sets up a subscription with the presence service regarding a presentity. The subscriber may or may not receive presence information in response to setting up the subscription. Updates to the presence information are provided to the subscriber as asynchronous notifications which have been triggered by the presentity's publishing action, unconnected to a subscriber request or subscription action.

In another particular embodiment, a method of providing time interval processing and annotation in a presence system includes obtaining presence information attributes relating to a presentity. The method includes modifying the presence information for the presentity with the presence information attributes to provide annotated presence information for the presentity. The method further includes making available the annotated presence information to at least one subscriber.

Other embodiments include a computer readable medium having computer readable code thereon for providing time interval processing and annotation in presence systems. The computer readable medium includes instructions for obtaining presence information attributes relating to a presentity. The computer readable medium further includes instructions for modifying presence information for said presentity with the presence information attributes to obtain annotated presence information for the presentity. The computer readable medium also includes instructions for forwarding the annotated presence information to at least one subscriber.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides time interval processing and annotation as explained herein that when performed (e.g. when executing) on the processor, operates as explained herein within the computerized device to perform all of the method embodiments and operations explained herein as embodiments of the invention. Thus, any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing time interval processing and annotation in a presence system as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Presence systems allow users to advertise various information about their status, such as whether they consider themselves to be available or busy, and whether they are reachable by various communication means such as instant messaging (IM). These presence cues are helpful in coordinating conversations among people who are distant from each other and so cannot use more conventional means of communication. The present time interval processing and annotation in presence systems annotates the basic status. For example, while a conventional presence system may publish an "available" status, the present invention provides annotated presence information such as "available AND during normal workday".

Figure 1:
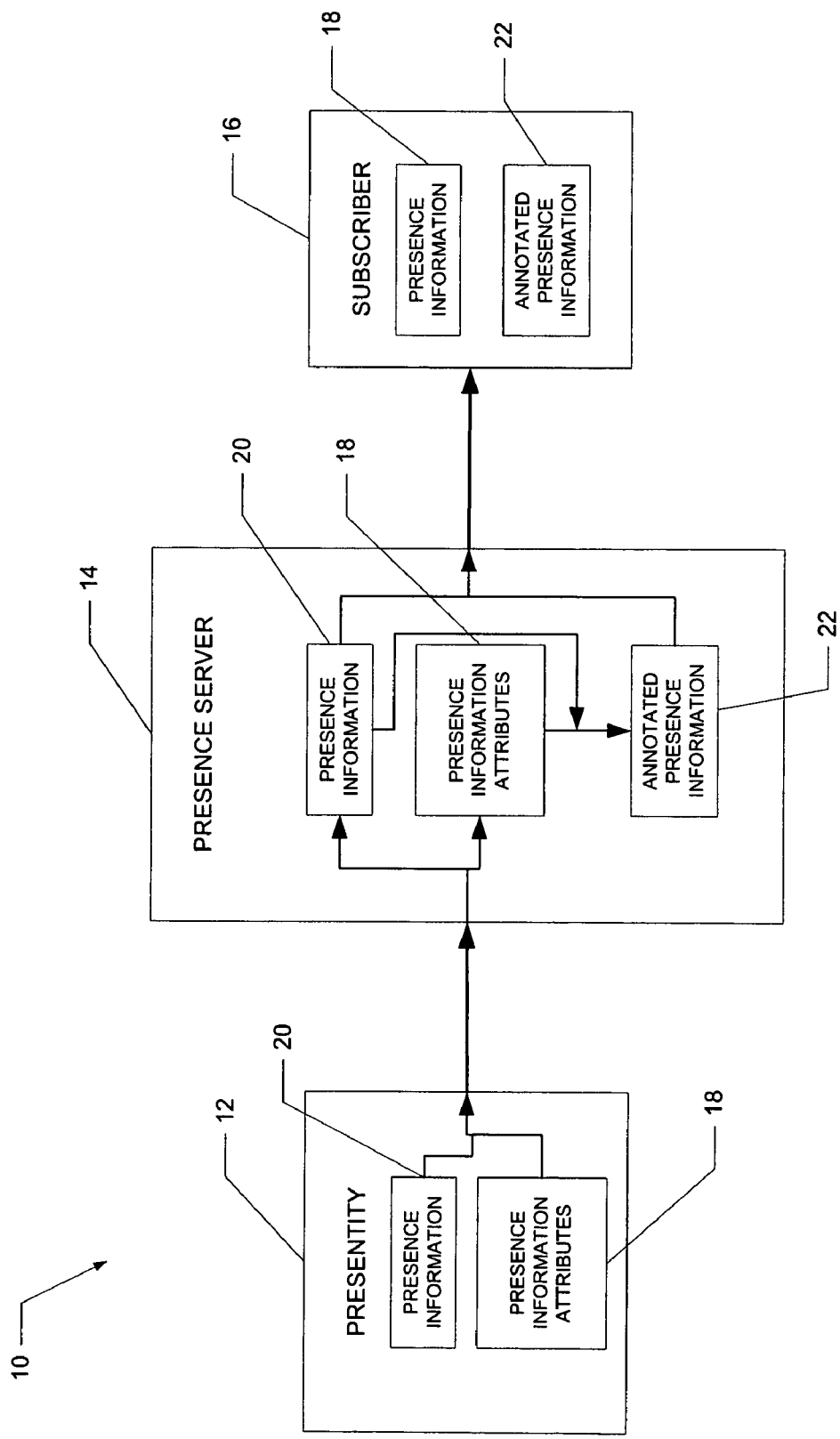
FIG. 1 is a block diagram of an environment for time interval processing and annotation in a presence system.

Referring now to FIG. 1, a particular embodiment of a system 10 providing time interval processing and annotation is shown. The system 10 includes a presence server 14 that is in communication with a presentity 12 and at least one subscriber 16. The presentity 12 provides presence information 20 and further supplies presence information attributes 18 to the presence server. The presence server 14 includes presence information 20 relating to the presentity 12 as well as the presence information attributes. The presence information 20 is used, in conjunction with the presence information attributes 18 received from the presentity, to produce annotated presence information 22. The presence server 14 then forwards the annotated presence information 22 to the subscriber 16. The subscriber 16 may also receive the presence information 20. The annotated presence information may change without the presentity changing the information supplied to the presence server. Stated differently, the annotated presence information may be updated asynchronously with respect to the presentity and the subscriber. That is, the annotated presence information may change at a certain time, whereas the presence information and/or the presence information attributes have not changed at that time. This change to the annotated presence information 22 is then passed on to the subscriber. While the presence server is shown as a single server for the sake of explanation, it should be appreciated that the presence server may actually comprise several cooperating servers working together to provide an abstraction of a presence service.

In a particular example, the presence information attributes 18 may include time data such as the local time of the presentity 12 and the time zone the presentity 12 is currently located in. The local time may be represented as Universal Time Clock (UTC) time and the time zones are represented as offsets from the UTC time. In some scenarios there may be an external source of UTC, such as a Global Positioning System (GPS) receiver. The presence information attributes 18 may further include availability information related to the presentity 12. Availability information may include times the presentity 12 is available and times the presentity 21 is unavailable. The times the presentity 12 is available and times the presentity 12 is unavailable may be set according to a default schedule. The availability information may also include at least one time interval, each time interval having a start time and an end time. The presence information attributes 18 may also include other information relating to the presentity, including but not limited to, the physical locale of presentity 12.

The presence server 14 includes presence information 20 relating to the presentity 12. The presence information 20 is used, in conjunction with the presence information attributes 18 received from the presentity, to produce annotated presence information 22. An example of how the presence information attributes 18 and the presence information 20 are used to produce annotated presence information 22 involves the use of an interval rule. In this example, the presentity is located on the east coast of the United States and has a schedule that states the person in available during normal working hours, such as 9:00 a.m. Eastern Standard Time (EST) to 5:00 p.m. EST. The presence server 14 maintains this presence information 20 for the presentity 12. The presence server 14 then receives presence information attributes 18 from the presentity 12 indicating the presentity 12 has traveled to the west coast of the United States, and while still available from 9:00 a.m. to 5:00 p.m., the presentity is now available at those times in the Pacific time zone, therefore would be available at noon to 8:00 p.m. EST. The presence server 14, applying the interval rule to the presence information 20 and presence information attributes 18 thus produces the annotated presence information 22. The presence server 14 then forwards the annotated presence information 22 to the subscriber 16, which is requesting data relating to the presentity 12. While a simple interval rule has been described in this example, it should be appreciated that more elaborate interval rules could be used. The interval rule could be supplied by the presentity, supplied by the presence server, or could be supplied by the subscriber.

The system 10 is not limited to only providing calendar and time related information. For example, the presence server 14 may have a list of acquaintances for the presentity 12. When the presence information attributes 18 are updated by the presentity and forwarded to the presence server 14, the presence server 14 may determine a listing of common persons in the list of acquaintances of the presentity and a list of acquaintances of the subscriber. The presence server may further determine which of these common persons are also in the same physical locale as the presentity 12. While the presentity and the subscriber have been described being persons, it should be appreciated that that the presentity and/or subscriber could also be realized as an object such as a package being delivered, a machine, and a computer system and/or device.

While a single presentity 12 is shown communicating with a presence server 14, it should be appreciated that multiple presentities could be communicating with the presence server 14, with each presentity having respective presence information 20, presence information attributes 18 and annotated presence information 22. Similarly, while only a single subscriber 16 is shown, it should be appreciated that multiple subscribers could be communicating with the presence server 14. Also, while the presence server has been described as applying a rule to determine the annotated presence information from the presence information and presence information attributes, this function could alternatively be provided by either the presentity or the subscriber.

As described above and shown in the above examples, by way of the present time interval processing and annotation in a presence system, a subscriber sets up a subscription and may receive presence information in response to the setting up of the subscription. Any updates to the presence information for the subscriber come as asynchronous notifications triggered by the presentity's publishing action, unconnected to any subscriber request or subscription action.

Figure 2:
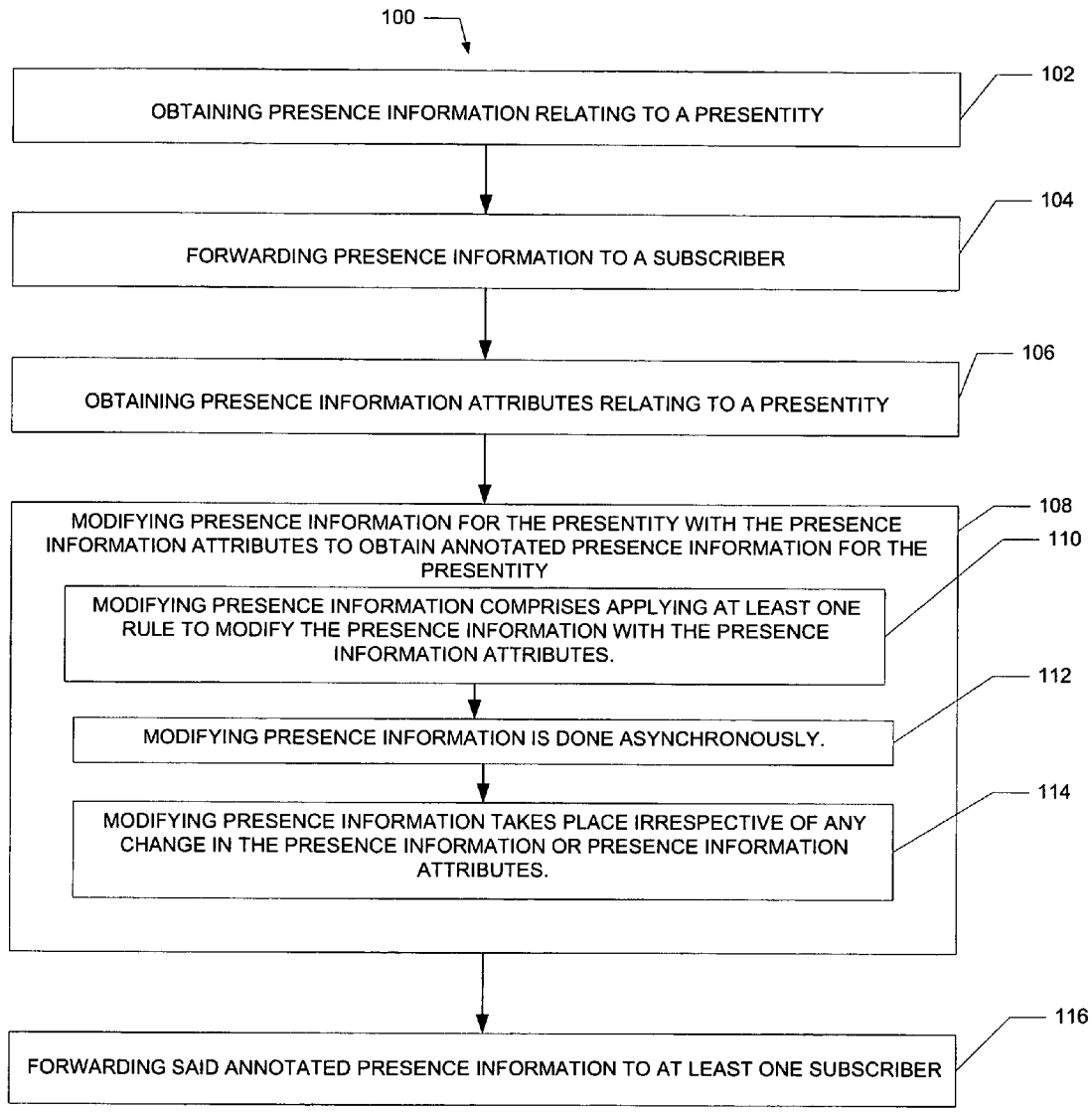
FIG. 2 is a flow diagram for a method of performing time interval processing and annotation in a presence system.

A flow chart of a particular implementation of a method for time interval processing and annotation in presence systems is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 of providing time interval processing and annotation in a presence system is shown. The method starts at processing block 102 which states obtaining presence information relating to a presentity. The presentity publishes its presence information to subscribers by way of a presence server, thus the subscriber 16 may include a copy of the presence information 20, as may the presence server.

Processing block 104 discloses forwarding the presence information to a subscriber. The presence server maintains presence information for the presentity and will utilize the presence information attributes to annotate the presence information in order to provide up-to-date information to the subscriber.

Processing block 106 recites obtaining presence information attributes relating to the presentity. The presence information attributes may include, for example, the local time of the presentity, the time zone the presentity is located in, and availability information related to the presentity.

Processing block 108 states modifying presence information for the presentity with the presence information attributes to obtain annotated presence information for the presentity.

Processing block 110 discloses modifying presence information is accomplished by applying at least one rule to modify the presence information with the presence information attributes. This rule may apply and queue changes that are made or need to be made to the presentity presence information to incorporate the presentity's presence information attributes in order to provide the annotated presence information.

Processing block 112 recites modifying presence information is done asynchronously. Processing block 114 states modifying the presence information takes places irrespective of any change in the presence information or the presence information attributes. Thus, the annotated presence information may change independently from the presentity changing the information it provides to the presence server.

Processing block 116 states forwarding the annotated presence information to at least one subscriber. The subscribers are thus made aware of the latest presence information regarding the presentity.

Figure 3:
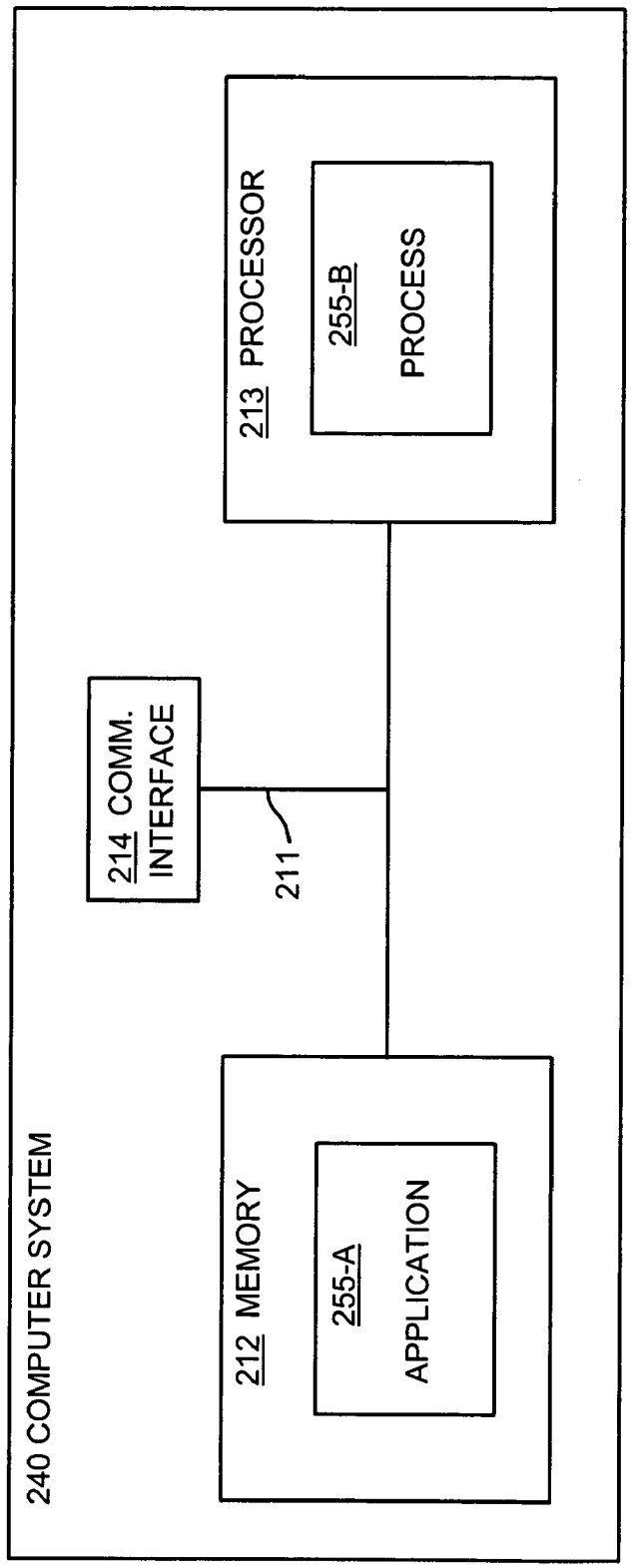
FIG. 3 illustrates an example computer system architecture for a computer system that performs time interval processing and annotation in accordance with embodiments of the invention.

Referring now to FIG. 3, an example architecture of a computer system that is configured as a host computer system 240 is shown. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 3 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing time interval processing and annotation in a presence system comprising:
   obtaining presence information relating to a presentity, said presentity comprising a first entity;
   forwarding said presence information to at least one subscriber;
   obtaining presence information attributes relating to said presentity wherein said presence information attributes include a local time of the presentity and a time zone the presentity is currently located in and wherein the at least one subscriber is requesting information relating to the presentity;
   modifying presence information for said presentity with said presence information attributes to obtain annotated presence information for said presentity wherein said modifying presence information comprises applying at least one rule to modify said presence information with said presence information attributes, wherein said modifying presence information is done asynchronously and wherein said modifying presence information takes place irrespective of any change in said presence information or said presence information attributes; and
   forwarding said annotated presence information to said at least one subscriber, said subscriber comprising a second entity that has subscribed to the presentity's presence information.

2. The method of claim 1 local time of the presently is represented as a Universal Time Clock (UTC) time and wherein a time zone the presently is currently located in is represented as an offset to said UTC time.

3. The method of claim 1 wherein said presence information includes a physical locale of said presentity.

4. The method of claim 1 wherein said interval rule is supplied by at least one of the group consisting of the presentity, the presence server and by the subscriber.

5. The method of claim 1 further comprising determining a list of common persons from a list of acquaintances of said presentity and a list of acquaintances of said subscriber.

6. The method of claim 5 further comprising determining which of the common persons are in a same physical locale as said presentity.

7. A computer readable medium having computer readable code thereon for providing time interval processing and annotation in presence systems, the medium comprising:
   instructions for obtaining presence information relating to a presentity, said presentity comprising a first entity;
   instructions for obtaining presence information attributes include a local time of the presentity and a time zone the presentity is currently located in and wherein the at least one subscriber is requesting information relating to the presentity;
   instructions for modifying presence information for said presentity with said presence information attributes to obtain annotated presence information for said presentity wherein said modifying presence information comprises applying at least one rule to modify said presence information with said presence information attributes, wherein said modifying presence information is done asynchronously and wherein said modifying presence information takes place irrespectively of any change in said presence information or said presence information attributes; and
   instructions for forwarding said annotated presence information to said at least one subscriber, said subscriber comprising a second entity that has subscribed to the presentity's presence information.

8. The computer readable medium of claim 7 wherein said local time of the presentity is represented as a Universal Time Clock (UTC) time and wherein a time zone the presentity is currently located in is represented as an offset to said UTC time.

9. The computer readable medium of claim 8 wherein said UTC comprises s a Global Positioning system (GPS).

10. The computer readable medium of claim 7 wherein said presence information includes a physical locale of said presentity.

11. The computer readable medium of claim 7 wherein said interval rule is supplied by at least one of the group consisting of the presentity, the presence server and by the subscriber.

12. The computer readable medium of claim 7 further comprising instructions for determining a list of common persons from a list of acquaintances of said presentity and a list of acquaintances of said subscriber.

13. The computer readable medium of claim 12 further comprising instructions for determining which of the common persons are in a same physical locale as said presentity.

14. A computer system comprising:
   a memory;
   a processor;
   a communication interface;
   an interconnection mechanism coupling the memory, the processor and the communications interface; and
   wherein the memory is encoded with a time interval processing and annotation application that when performed on the processor, provides a process for processing information, the process causing the computer system to perform the operations of:
   obtaining presence information relating to a presentity, said presentity comprising a first entity;
   forwarding said presence information to at least one subscriber obtaining presence information attributes relating to said presentity wherein said presence information attributes include a local time of the presentity and a time zone the presentity is currently located in and wherein the at least one subscriber is requesting information relating to the presentity;

modifying presence information for said presentity with said presence information attributes to obtain annotated presence information for said presentity wherein said modifying presence information comprises applying at least one rule to modify said presence information with said presence information attributes, wherein said modifying presence information is done asynchronously and wherein said modifying presence information takes place irrespectively of any change in said presence information or said presence information attributes; and forwarding said annotated presence information to said at least one subscriber, said subscriber comprising a second entity that has subscribed to the presentity's presence information.

15. The computer system of claim 14 wherein said local time of the presentity is represented as a Universal Time Clock (UTC) time and wherein a time zone the presentity is currently located in is represented as an offset to said UTC time.

16. The computer system of claim 15 wherein said UTC comprises s a Global Positioning system (GPS).

17. The method of claim 2 wherein said UTC comprises s a Global Positioning system (GPS).

18. The computer system of claim 14 wherein said presence information includes a physical locale of said presentity.

19. The computer system of claim 14 wherein said interval rule is supplied by at least one of the group consisting of the presentity, the presence server and by the subscriber.

20. The computer system of claim 14 further comprising determining a list of common persons from a list of acquaintances of said presentity and a list of acquaintances of said subscriber.

21. The computer system of claim 20 further comprising determining which of the common persons are in a same physical locale as said presentity.

* * * * *